US009401988B2

(12) United States Patent
Fiedorowicz et al.

(10) Patent No.: US 9,401,988 B2
(45) Date of Patent: Jul. 26, 2016

(54) FACILITATING CONTEXT DELIVERY DURING COMMUNICATION SESSIONS

(71) Applicant: INTERNATIONAL BUSINESS MACHINES CORPORATION, Armonk, NY (US)

(72) Inventors: Erik Fiedorowicz, Denver, CO (US); Sri Ramanathan, Lutz, FL (US); Matthew A. Terry, Dunwoody, GA (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/674,323

(22) Filed: Mar. 31, 2015

(65) Prior Publication Data
US 2015/0207932 A1 Jul. 23, 2015

Related U.S. Application Data

(63) Continuation of application No. 12/956,251, filed on Nov. 30, 2010, now Pat. No. 9,077,799.

(51) Int. Cl.
*G06F 15/16* (2006.01)
*H04L 12/16* (2006.01)
(Continued)

(52) U.S. Cl.
CPC .............. *H04M 3/493* (2013.01); *G06Q 10/10* (2013.01); *H04L 12/1818* (2013.01);
(Continued)

(58) Field of Classification Search
CPC ....... H04M 3/58; H04M 3/563; H04M 3/543; H04M 3/42229; H04M 3/42195
See application file for complete search history.

(56) References Cited

U.S. PATENT DOCUMENTS 5,563,805 A 10/1996 Arbuckle et al.
6,311,231 B1 * 10/2001 Bateman ........... G06F 17/30899
379/210.01

(Continued)

FOREIGN PATENT DOCUMENTS

CN 101502086 8/2009
CN 101686163 3/2010
(Continued)

OTHER PUBLICATIONS

Petric et al., "Agent-Based Support for Context-Aware Provisioning of IMS-Enabled Ubiquitous Services", SOCASE 2009, LNCS 5907, pp. 71-82.
(Continued)

*Primary Examiner* — Brian Roberts
*Assistant Examiner* — Abu-Sayeed Haque
(74) *Attorney, Agent, or Firm* — Matthew Chung; Andrew M. Calderon; Roberts, Mlotkowski, Safran & Cole PC

(57) ABSTRACT

An approach is disclosed that facilitates context delivery during communication sessions. The approach may be implemented in a computer infrastructure having computer executable code tangibly embodied on a computer readable storage medium having programming instructions operable to: render at least one service to a user device through a communication session; collect information of the communication session; and send the information of the communication session to a service provider when a call is setup between the user device and the service provider. The service provider renders the information of the communication session for viewing by the service provider.

16 Claims, 3 Drawing Sheets

(51) Int. Cl.

| | | |
|---|---|---|
| *H04M 3/493* | (2006.01) | |
| *H04L 12/18* | (2006.01) | |
| *H04M 3/42* | (2006.01) | |
| *H04M 3/487* | (2006.01) | |
| *G06Q 10/10* | (2012.01) | |
| *H04L 29/08* | (2006.01) | |
| *H04M 3/51* | (2006.01) | |
| *H04M 1/57* | (2006.01) | |
| *H04M 3/54* | (2006.01) | |
| *H04M 3/58* | (2006.01) | |

(52) U.S. Cl.
CPC .......... *H04L 67/02* (2013.01); *H04M 3/42144* (2013.01); *H04M 3/4872* (2013.01); *H04M 3/5166* (2013.01); *H04M 3/5183* (2013.01); *H04M 1/576* (2013.01); *H04M 3/543* (2013.01); *H04M 3/58* (2013.01); *H04M 2203/2038* (2013.01)

(56) References Cited

U.S. PATENT DOCUMENTS

| | | | |
|---|---|---|---|
| 6,353,608 B1* | 3/2002 | Cullers | H04L 29/06 370/352 |
| 6,614,781 B1* | 9/2003 | Elliott | H04L 12/6418 370/352 |
| 6,988,126 B2 | 1/2006 | Wilcock et al. | |
| 7,149,302 B2 | 12/2006 | Tsukazoe et al. | |
| 7,561,535 B2* | 7/2009 | Naqvi | H04M 7/006 370/260 |
| 7,580,862 B1 | 8/2009 | Montelo et al. | |
| 7,760,711 B1* | 7/2010 | Kung | H04L 12/14 370/352 |
| 8,073,129 B1* | 12/2011 | Kalavar | H04M 3/5233 379/265.01 |
| 2002/0055973 A1 | 5/2002 | Low et al. | |
| 2002/0091832 A1 | 7/2002 | Low et al. | |
| 2004/0059841 A1* | 3/2004 | Bateman | G06F 17/30899 710/6 |
| 2005/0187781 A1* | 8/2005 | Christensen | H04L 12/581 709/207 |
| 2005/0286466 A1* | 12/2005 | Tagg | H04L 12/2856 370/329 |
| 2006/0046757 A1* | 3/2006 | Hoover | H04M 3/533 455/518 |
| 2008/0101339 A1* | 5/2008 | Forbes | H04L 12/66 370/352 |
| 2008/0120692 A1* | 5/2008 | Gupta | H04L 67/24 726/1 |
| 2008/0139188 A1* | 6/2008 | Purontaus | H04L 12/1818 455/416 |
| 2008/0205628 A1* | 8/2008 | Mandalia | H04M 3/42365 379/265.11 |
| 2009/0112875 A1* | 4/2009 | Maes | G06F 17/30575 |
| 2009/0190507 A1* | 7/2009 | Li | H04M 3/42 370/271 |
| 2009/0228584 A1* | 9/2009 | Maes | G06F 9/542 709/224 |
| 2009/0271469 A1 | 10/2009 | Benco et al. | |
| 2009/0296930 A1* | 12/2009 | Krantz | H04L 9/32 380/247 |
| 2010/0075673 A1 | 3/2010 | Colbert et al. | |
| 2010/0077082 A1* | 3/2010 | Hession | G06Q 30/016 709/227 |
| 2010/0118859 A1* | 5/2010 | Williams | H04M 3/42221 370/352 |
| 2010/0296646 A1* | 11/2010 | Hemm | G06Q 10/107 379/265.02 |
| 2011/0196913 A1* | 8/2011 | Acharya | H04L 67/24 709/203 |

FOREIGN PATENT DOCUMENTS

| | | |
|---|---|---|
| JP | 2001142828 | 5/2001 |
| JP | 2003087421 | 3/2003 |
| JP | 2003298724 | 10/2003 |
| JP | 2004312521 | 11/2004 |

OTHER PUBLICATIONS

Chinese Office Action for related US Application No. 201110361366.8 dated Feb. 7, 2014, 14 pages.

* cited by examiner

FACILITATING CONTEXT DELIVERY DURING COMMUNICATION SESSIONS

TECHNICAL FIELD

The present invention generally relates to communication sessions, and more particularly, to facilitating context delivery during communication sessions.

BACKGROUND

Enterprise and telecommunication service providers are rapidly turning to the Internet as a key touchpoint for their subscribers. Using Internet or Mobile Web browsers, customers can subscribe to new services and offerings, purchase goods electronically, resolve problems that they experience, search knowledge bases, and so on. This trend to use the Internet as a customer touchpoint may be due to the providers' desire to reduce costs. Even with this use of the Internet as a customer touchpoint, there is still a need to ensure that customers can always receive access to help from another person. Towards this end, many call centers utilize Interactive Voice Response Units (IVRU's) to drive and manage customer traffic to provide more efficient help to the customer.

SUMMARY

In a first aspect of the invention, a method is implemented in a computer infrastructure having computer executable code tangibly embodied on a computer readable storage medium having programming instructions operable to: render at least one service to a user device through a communication session; collect information of the communication session; and send the information of the communication session to a service provider when a call is setup between the user device and the service provider. The service provider renders the information of the communication session for viewing by the service provider.

In another aspect of the invention, a system implemented in hardware includes a server operable to: render at least one service to a user device through a communication session; collect information of the communication session; and send the information of the communication session to a call center when a call is setup between the user device and the call center. The call center renders the information of the communication session for viewing by the call center.

In an additional aspect of the invention, a computer program product includes a computer usable storage medium having readable program code embodied in the storage medium, the computer program product includes at least one component operable to: receive a Session Initiation Protocol (SIP) notify message from an application server, the SIP notify message comprising references to cached context of a communication session between a user device and the application server; at least one of build and update a presence document comprising the references to all of the cached context throughout a duration of the communication session; and send a SIP publish message to a call center, the SIP publish message comprising the presence document. The call center renders the context of the communication session for viewing by a call center agent.

In a further aspect of the invention, a method of facilitating context delivery during communication sessions includes providing a computer infrastructure, being operable to: render at least one service to a user device through a communication session; collect information of the communication session; and send the information of the communication session to a service provider when a call is setup between the user device and the service provider. The service provider rendering the information of the communication session for viewing by the service provider. In another aspect of the invention, a computer system for facilitating context delivery during communication sessions includes a CPU, a computer readable memory and a computer readable storage media; first program instructions to render at least one web site to a user device through a communication session; second program instructions to collect information of the communication session; third program instructions to cache the collected information of the communication session; fourth program instructions to at least one of build and update a presence document comprising references to all of the cached information throughout a duration of the communication session; and fifth program instructions to send a Session Initiation Protocol (SIP) publish message to a service provider when a call is setup between the user device and the service provider. The SIP publish message comprises the presence document, and the service provider renders the information of the communication session for viewing by the service provider. The information of the communication session comprises at least one of: a HyperText Markup Language (HTML) content of at least one web page a user views; a media content of the web page the user views; personal user data; user device data; and user authorization data. The first, second, third, fourth, and fifth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
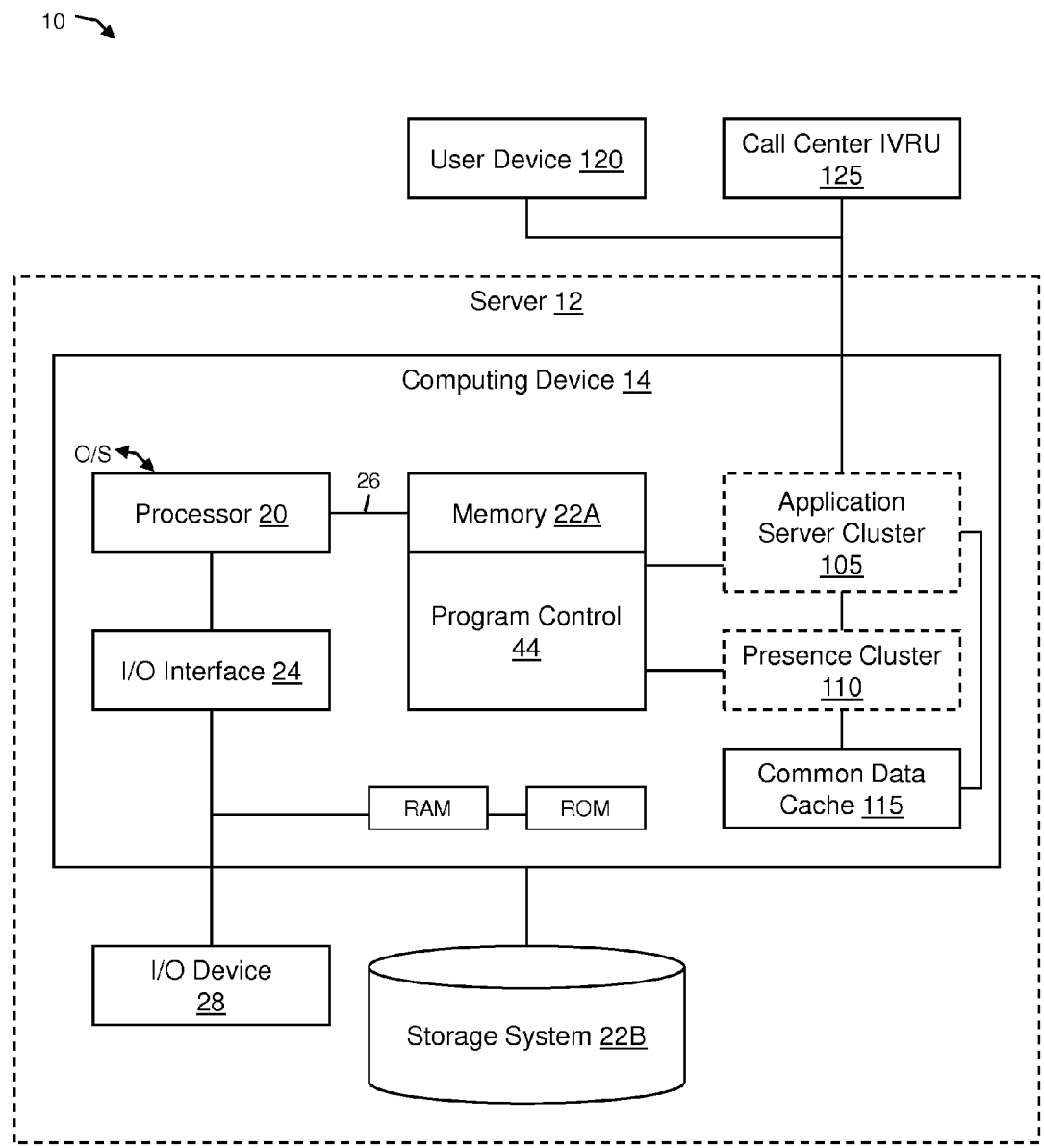
FIG. 1 shows an illustrative environment for implementing the steps in accordance with aspects of the invention.

The present invention generally relates to communication sessions, and more particularly, to facilitating context delivery during communication sessions. More specifically, the invention provides an application server and an Internet Protocol Multimedia Subsystem (IMS) compliant presence server that collect and store communication session information or context as a user browses through a web site. The session information is then presentable to a call center agent upon initiation of a Session Initiation Protocol (SIP) communication session.

For example, in operation, a subscriber may use the invention to log into a web site to purchase a product. The subscriber may find the site difficult to navigate. For example, after selecting the product, he or she may try to locate and place accessories associated with the product in his or her electronic shopping cart. After not being able to find the accessories, the subscriber may start to terminate his or her communication session with the web site. However, before terminating the session, the subscriber may select a "click-to-call" button or popup on the site. When he or she clicks on the button or popup, the subscriber may enter in the web site his or her cellular or landline telephone number and receive a phone call from a call center agent.

Advantageously, as provided by the invention, the call center agent may be presented with an exact replica of the subscriber's communication session with the web site, and may help resolve the subscriber's problem based on the presented replica. For instance, the call center agent may be able to find the exact accessories the subscriber is searching for, add the accessories to the shopping cart, and present the cart to the subscriber. In another example, the call center agent may assist the subscriber in editing the cart himself or herself. The subscriber may then checkout, e.g., electronically purchase the product along with the accessories.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14

(e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an application server cluster 105 and a presence cluster 110, e.g., the processes described herein. The application server cluster 105 and the presence cluster 110 can be implemented as one or more program code in the program control 44 stored in memory 22A as separate or combined modules. Additionally, the application server cluster 105 and the presence cluster 110 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention, for example, facilitating context delivery during communication sessions. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the application server cluster 105 may render at least one service of a business, such as a provision of a web site of an enterprise or telecommunication service provider, to a customer or subscriber of the service. For example, the application server cluster 105 may provide the web site to the customer via a communication session with an user device 120, such as a smartphone user device or a browser-based user device (e.g., a personal computer or laptop). The communication session between the application server cluster 105 and the user device 120 may use, for instance, the Hypertext Transfer Protocol (HTTP).

In embodiments, the application server cluster 105 may flag the customer as a special or "high-value" customer so that later, a call center may be alerted, if necessary, of the special customer browsing the web site. In embodiments, the special or high-value customer may be a customer with a membership account at the web site and/or be a subscriber of the service provided by the application server cluster 105. The application server cluster 105 may also setup a Voice over IP (VoIP) call between the customer using his or her user device 120 and a call center Interactive Voice Response Unit (IVRU) 125, when the customer, for instance, clicks on a "click-to-call" button or popup on the site and enters his or her VoIP number in the site. In this embodiment, if the customer is a high-value customer, before completing the VoIP call, the application server cluster 105 may automatically route the call to a queue of a specialized call center agent. The call between the customer and the call center IVRU 125 may occur while the customer is still browsing the web site.

During the web site communication session with the user device 120, the application server cluster 105 collects information (e.g., context) regarding the session, including, for example, HyperText Markup Language (HTML) content of a web page the customer views or drives (e.g., downloads). In embodiments, the communication session information may also include web applets, pictures, and videos ("media content") of the web page the customer views, personal user data (e.g., a customer's name and account number), user device data (e.g., smartphone number, device type), and user authorization data (e.g., the customer's login and password). The application server cluster 105 transfers the session information to a common data cache 115, where the session information is cached or stored.

The application server cluster 105 also transfers the communication session information to the presence cluster 110 via the SIP, specifically, in SIP notify messages. The presence cluster 110 receives the SIP notify messages including the session information and treats the session information as presence information. That is, the presence cluster 110 builds or updates a presence document including all of the session information throughout a duration of the communication session between the customer and the application server cluster 105. As a result, in embodiments, the presence document may include HTML content of each and every web page the customer views during the session. In embodiments, the presence document and the SIP notify messages may be in an Extensible Markup Language (XML) data format. In embodiments, the application server cluster 105 may instead transfer references to the session information stored in the common data cache 115, and thus, the presence document may instead include the references to the session information stored in the common data cache 115.

The presence cluster 110 also receives and manages a SIP subscribe message from the call center IVRU 125. The SIP subscribe message is a request to receive (e.g., to subscribe to) the presence document from the presence cluster 110 at a specific time, e.g., when a call is setup between the user device 120 and the call center IVRU 125. In embodiments, this call may be over a cellular network, the Internet (e.g., VoIP), or telephone service lines, or may be an instant messaging (IM) session over the Internet, while the customer is still browsing the web site. At the specific time, the presence cluster 110 automatically sends an SIP publish message including the presence document to the call center IVRU 125. The call center IVRU 125 then renders at least one web page the customer viewed during the communication session (e.g., a content history and/or context) based on the presence document, for viewing by a call center agent. Advantageously, as provided by the invention, the call center agent may view an exact replica of the customer's communication session with the web site, which may help the call center agent efficiently resolve the customer's problem with the web site.

Figure 2:
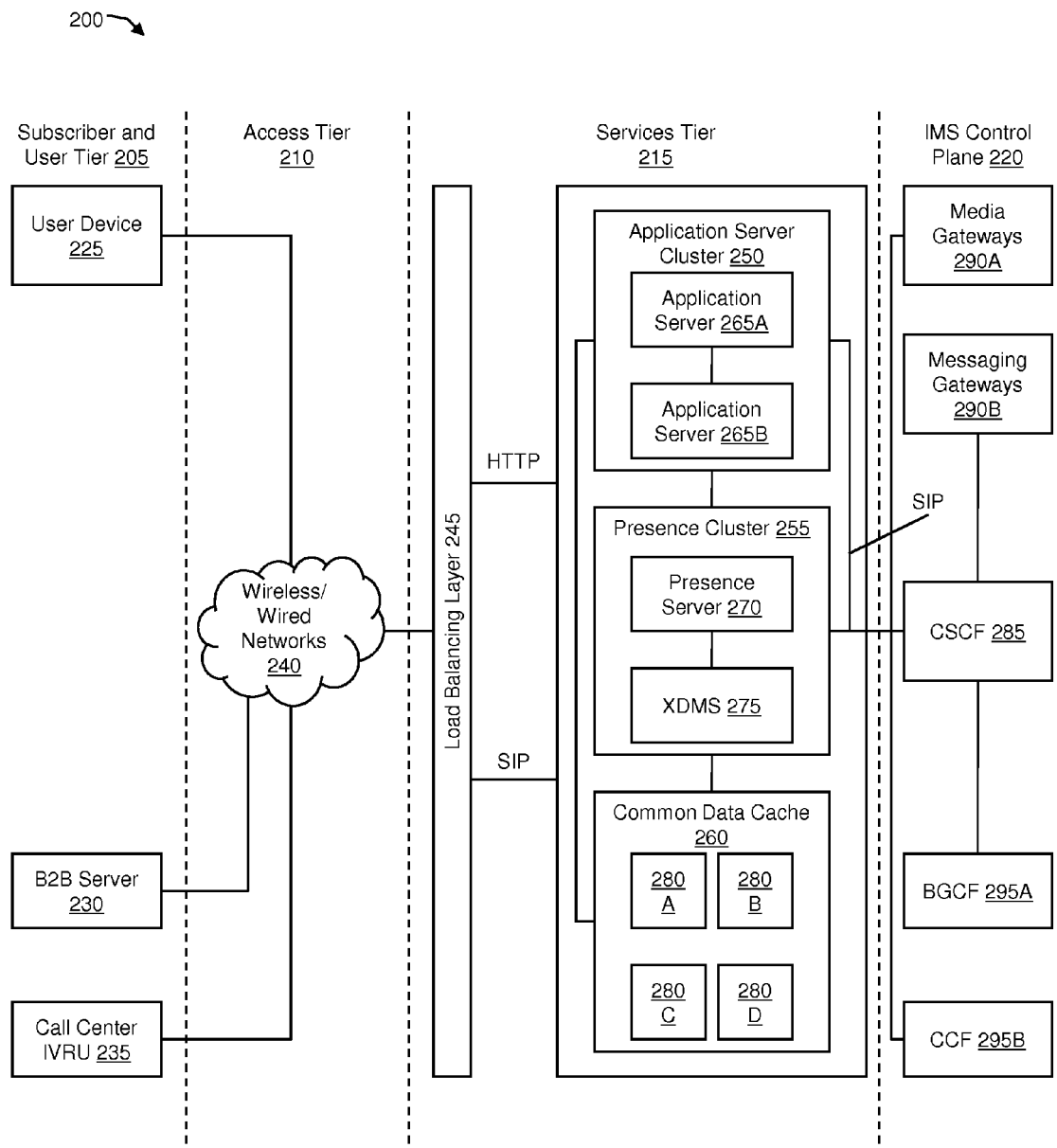
FIG. 2 shows another illustrative environment for implementing the steps in accordance with aspects of the invention.

FIG. 2 shows another illustrative environment 200 for implementing the steps in accordance with aspects of the invention. The environment 200 includes a subscriber and user tier 205, an access tier 210, a services tier 215, and an IMS control plane 220. In embodiments, the subscriber and user tier 205 may include at least one user device 225, such as a smartphone user device and/or a browser-based user device, a business-to-business (B2B) server 230, and a call center IVRU 235. The user device 225 and the call center IVRU 235 may include functionality similar to those of the user device 120 and the call center IVRU 125, respectively, in FIG. 1. The B2B server 230 may be a server of another business, such as another enterprise or telecommunication service provider, desiring to use services provided by the services tier 215.

The entities in the subscriber and user tier 205 are connected to wireless/wired networks 240 of the access tier 210. The wireless/wired networks 240 may include, for example, the Internet and/or a cellular network that allows the entities in the subscriber and user tier 205 to communicate with the services tier 215. The services tier 215 includes a load balancing layer 245, an application server cluster 250, a presence cluster 255, and a common data cache 260. The load balancing layer 245 receives data (e.g., a load) from the wireless/wired networks 240 and may distribute the data evenly between entities in the services tier 215, such as the clusters 250, 255. For instance, the load balancing layer 245 may be provided in a network switch and a gateway router. The load balancing layer 245 includes a web client and an SIP client such that the load balancing layer 245 is able to communicate in SIP and HTTP with other SIP-enabled and/or HTTP-enabled entities, such as the clusters 250, 255.

In embodiments, the application server cluster 250, the presence cluster 255, and the common data cache 260 may perform the same functions as those of the application server cluster 105, the presence cluster 110, and the common data cache 115, respectively, in FIG. 1. In embodiments, the application server cluster 250 may include a plurality of application servers 265A, 265B, such as an application server 265A and an application server 265B. Each of the application servers 265A, 265B may render at least one service of a business, such as providing a web site of an enterprise or telecommunication service provider, to a customer or subscriber of the service. For example, the application server 265A may provide a web site to a customer via a communication session with the user device 225. During communication sessions between the application server cluster 250 and the entities in the subscriber and user tier 205, the application server cluster 250 collects communication session information (e.g., context), and updates the common data cache 260 with the session information. Further, the application sever cluster 250 transfers SIP notify messages to the presence cluster 255 that includes the session information or references to the session information in the common data cache 260.

The presence cluster 255 includes a presence server 270 and a XML Data Management Server (XDMS) 275. The presence server 270 receives the SIP notify messages including the communication session information and forwards the session information to the XDMS 275. The XDMS 275 builds or updates a presence document including all of the session information (or the references to the session information in the common data cache 260) throughout a duration of the communication session between the customer and the application server cluster 250. The presence server 270 also receives and manages a SIP subscribe message from the call center IVRU 235 that requests to receive the presence document from the presence server 270 at a specific time, e.g., when a call is setup between the user device 225 and the call center IVRU 235. At the specific time, the presence server 270 automatically sends an SIP publish message including the presence document to the call center IVRU 235. The call center IVRU 235 then renders at least one web page the customer viewed during the communication session (e.g., context) based on the presence document, for viewing by a call center agent. Advantageously, as provided by the invention, the call center agent may view the same web page the customer views, and may quickly understand the customer's problem with the web site and assist the customer based on the viewed web page, all while in the call with the customer.

In embodiments, the common data cache 260 may include a plurality of databases 280A, 280B, 280C, 280D. Each of the databases 280A, 280B, 280C, 280D may cache or store a type of communication session information between the customer and the application server cluster 250. For example, a database 280A may include HTML content and media of web pages the customer views or drives, a database 280B may include personal user data, a database 280C may include user device data, and a database 280D may include user authorization data. In embodiments, the database 280D may be a Home Subscriber Server (HSS) of the IMS and thus, include subscription-related information of subscribers, e.g., subscriber profiles.

In embodiments, the IMS control plane 220 may include a Call Session Control Function (CSCF) 285, a plurality of gateways 290A, 290B, and plurality of call functions 295A, 295B. The CSCF 285 is a SIP server that controls SIP communication sessions between the customer and the application server cluster 250. The CSCF 285 also controls SIP messaging between the call center IVRU 235 and the presence cluster 255 and between the clusters 250, 255.

In embodiments, the gateways 290A, 290B may include media gateways 290A that convert digital media between different telecommunication networks (e.g., in wireless/wired networks 240), and messaging gateways 290B that transfer messages (e.g., Short Message Service (SMS) messages) between the entities in the subscriber and user tier 205. In embodiments, the call functions 295A, 295B may include a Breakout Gateway Control Function (BGCF) 295A that routes data from the CSCF 285 when the CSCF 285 determines that a communication session cannot be routed using the Domain Name System (DNS). The call functions 295A, 295B may also include a Charging Control Function (CCF) 295B that collects charging or accounting information of communication sessions in the IMS.

Flow Diagram

Figure 3:
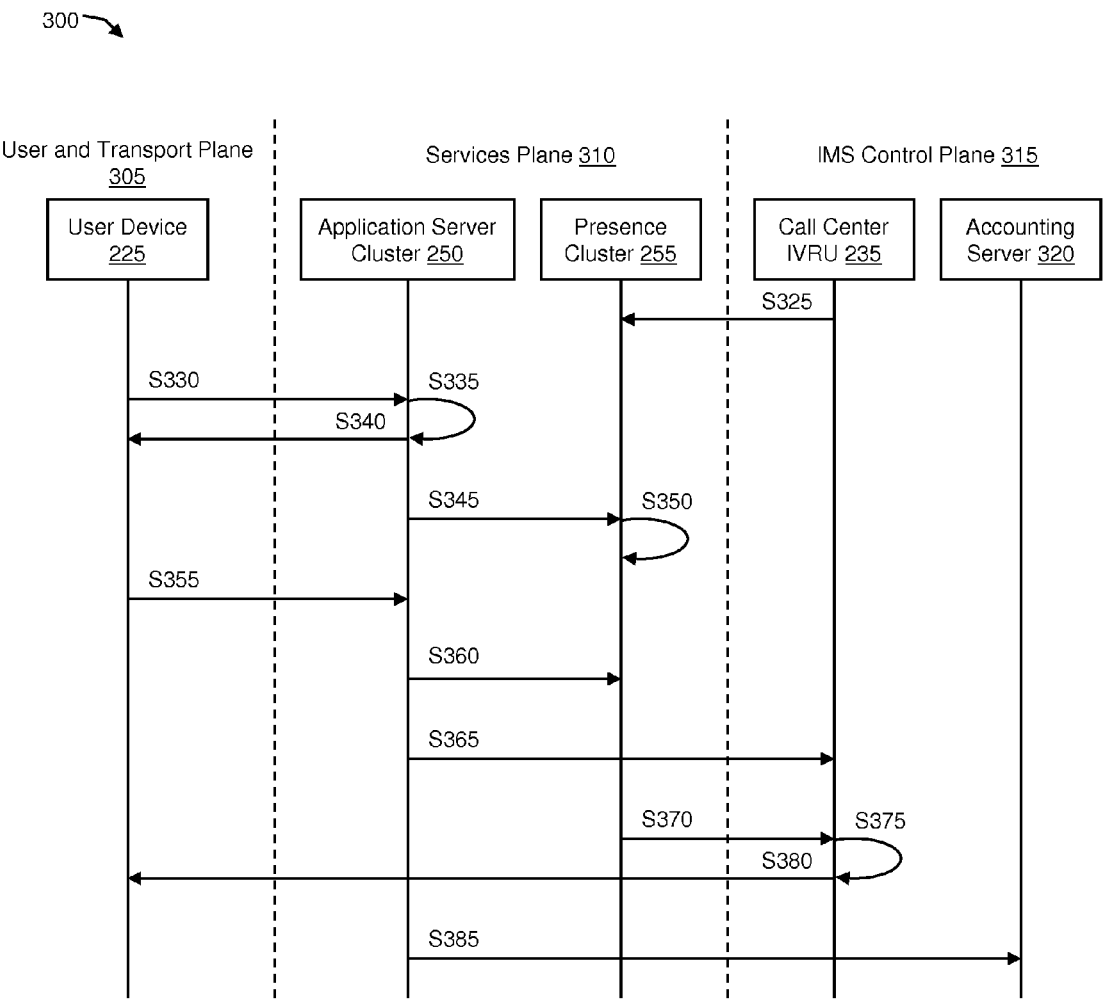
FIG. 3 shows an exemplary flow in accordance with aspects of the invention.

FIG. 3 shows an exemplary flow for performing aspects of the present invention. The steps of FIG. 3 may be implemented in the environment of FIGS. 1-2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process 300 in accordance with aspects of the present invention. The process 300 includes a user and transport plane 305, a services plane 310, and an IMS control plane 315, which may correspond to the subscriber and user tier 205, the services tier 215, and the IMS control plane 220, respectively, in FIG. 2. The user and transport plane 305 includes the user device 225, as shown in FIG. 2. The services plane 310 includes the application server cluster 250 and the presence cluster 255, as shown in FIG. 2. The IMS control plane 315 includes the call center IVRU 235, as shown in FIG. 2, and an accounting server 320 that may be implemented in, for example, the CCF 295B in FIG. 2.

At step S325, the process starts, and the call center IVRU 235 sends a SIP subscribe message to the presence cluster 255, to be informed of communication session information between at least one customer or subscriber and the application server cluster 250. In embodiments, the call center IVRU 235 may request to be informed of session information of only a special or high-value customer, or of a customer that logs in and begins a hot-item shopping session. In embodiments, the special or high-value customer may, for example, be a customer with a membership account at the web site and/or be a subscriber of the service provided by the application server cluster 250. The hot-item shopping session may be, for instance, a communication session between a customer and a shopping web site provided by the application server cluster 250, where the customer is searching for a popular or recently-released item. At step S330, the customer via the user device 225 requests a service from the application server cluster 250 via, for example, continuing his or her web site communication session and clicking through a variety of web pages. At step S335, the application server cluster 250 updates a cache (e.g., the common data cache 260 in FIG. 2) with the session information every time it is rendered.

At step S340, the application server cluster 250 renders the requested service (e.g., sends a web page) to the user device 225. At step S345, the application server cluster 250 sends a SIP notify message to the presence cluster 255 that includes the updated communication session information or references to the updated session information in the cache. At step S350, the presence cluster 255 builds or updates the presence document including all of the session information (or the references to the session information in the cache) throughout a duration of the session between the customer and the application server cluster 250. At step S355, the customer may have a problem with the received web page and informs the application server cluster 250 that he or she would like to initiate a call with a call center agent. In embodiments, this may be accomplished when the customer clicks a "click-to-call" button or popup on the site and enters his or her VoIP number in the site.

At step S360, the application server cluster 250 sends a SIP notify message to the presence cluster 255 that indicates that the customer desires to setup a call to the call center IVRU 235. At step S365, the application server cluster 250 sets up a VoIP call between the customer using his or her user device 225 and the call center IVRU 235. At step S370, the presence cluster 255 sends a SIP publish message to the call center IVRU 235 that includes the presence document. At step S375, the call center IVRU 235 then renders at least one web page the customer viewed during the communication session (e.g., context) based on the presence document, for viewing by a call center agent. In embodiments, the call center IVRU 235 may read the references of the communication session information in the cache to render the context. With the rendered context, the call center agent may better assist the customer in his or her experience with the web site.

At step S380, the call center IVRU 235 ends the call with the user device 225. In embodiments, the call center IVRU 235 may send the user device 225 information regarding the call, including for example, times when the call started and ended and/or a duration of the call. At step S385, the application server cluster 250 cuts accounting records with the accounting server 320. In embodiments, the cutting of the accounting records may include indicating to the accounting server 320 that the call has ended, that security records (e.g., user authorization) should be released, and that call center records should be updated with the time when the call ended for accounting purposes. At step S385, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer program product comprising a computer readable hardware storage device having readable program code embodied in the hardware storage device, the computer program product includes at least one component operable to:
   receive, at a computing system remote from a user device, a subscribe message from a call center requesting information for a communication session between the user device and an application server;
   receive a request from the user device for at least one service at the application server;
   render the at least one service to the user device through the communication session;
   receive a message from the user device requesting a call with a service provider; and
   send a presence document to the service provider when the call is setup between the user device and the service provider, the service provider rendering the information of the communication session for viewing by the service provider, wherein the rendering is a replica of the at least one service rendered to the user device.

2. The computer program product of claim 1, wherein the at least one service comprises a provision of a web site of the service provider.

3. The computer program product of claim 1, wherein the information of the communication session comprises at least one of:
   a HyperText Markup Language (HTML) content of at least one web page a user views;
   a media content of the web page the user views;
   personal user data;
   user device data; and
   user authorization data.

4. The computer program product of claim 1, wherein the at least one component is further operable to cache the information of the communication session.

5. The computer program product of claim 4, wherein the at least one component is further operable to:
   at least one of build and update the presence document comprising references to all of the cached information throughout a duration of the communication session; and
   send a Session Initiation Protocol (SIP) publish message to the service provider when the call is setup between the user device and the service provider, the SIP publish message comprising the presence document.

6. The computer program product of claim 1, wherein the at least one component is further operable to:
   at least one of build and update the presence document comprising all of the information throughout a duration of the communication session; and
   send a Session Initiation Protocol (SIP) publish message to the service provider when the call is setup between the user device and the service provider, the SIP publish message comprising the presence document.

7. The computer program product of claim 1, wherein the service provider comprises a call center Interactive Voice Response Unit (IVRU).

8. The computer program product of claim 1, wherein the at least one component is further operable to:
   flag a user of the user device as a special user; and
   at least one of:
      alert the service provider of the special user; and
      route a call between the special user and the service provider to a queue of a specialized service provider agent.

9. The computer program product of claim 1, wherein the presence document includes HTML content of each web page a customer views during the communication session.

10. The computer program product of claim 1, wherein the replica of the at least one service rendered to the user device includes an exact replica of the user device's communication session with a web site.

11. A system implemented in hardware, comprising:
   a server comprising a processor and programmed to:
      receive a first Session Initiation Protocol (SIP) notify message from an application server, the SIP notify message comprising references to cached context of a communication session between a user device and the application server;
      receive a second SIP notify message from the application server, the second SIP notify message comprising a request to initiate a call between the user device and a call center; and
      send a SIP publish message to the call center, the SIP publish message comprising a presence document, the call center rendering the cached context of the communication session for viewing by a call center agent.

12. The system of claim 11, wherein the server is further operable to send the SIP publish message to the call center when a call is setup between the user device and the call center.

13. The system of claim 11, wherein the server is further operable to send a SIP subscribe message to the application server to be informed of communication session information between the user device and the application server.

14. The system of claim 13, wherein the server is further operable to request only the communication session information for customers flagged as special customers, for customers flagged as high-value customers, or for customers participating in a hot-item shopping session.

15. The system of claim 11, wherein the presence document includes HTML content of each web page a customer views during the communication session.

16. The system of claim 11, wherein the presence document includes all of the collected information throughout a duration of the communication session.

* * * * *